United States Patent
Shibata (10) Patent No.: US 11,377,742 B2
(45) Date of Patent: Jul. 5, 2022

(54) METHOD FOR PRODUCING PIPING AND METHOD FOR FORMING OXIDE FILM ON INNER SURFACE OF COPPER PIPE

(71) Applicant: DAIKIN INDUSTRIES, LTD., Osaka (JP)

(72) Inventor: Yutaka Shibata, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 493 days.

(21) Appl. No.: 16/332,958

(22) PCT Filed: Sep. 26, 2017

(86) PCT No.: PCT/JP2017/034682
§ 371 (c)(1),
(2) Date: Mar. 13, 2019

(87) PCT Pub. No.: WO2018/062146
PCT Pub. Date: Apr. 5, 2018

(65) Prior Publication Data
US 2019/0249309 A1   Aug. 15, 2019

(30) Foreign Application Priority Data

Sep. 30, 2016   (JP) .............................. JP2016-192885

(51) Int. Cl.
| | |
|---|---|
| *C23C 22/52* | (2006.01) |
| *C23C 8/10* | (2006.01) |
| *C23C 22/68* | (2006.01) |
| *C23F 11/18* | (2006.01) |
| *C23C 22/78* | (2006.01) |
| *F28F 21/08* | (2006.01) |
| *F28F 19/00* | (2006.01) |
| *C23F 11/00* | (2006.01) |
| *C23C 8/40* | (2006.01) |
| *F28F 19/06* | (2006.01) |

(52) U.S. Cl.
CPC .............. *C23C 22/68* (2013.01); *C23C 22/78* (2013.01); *C23F 11/00* (2013.01); *C23F 11/18* (2013.01); *F28F 19/00* (2013.01); *F28F 21/08* (2013.01); *F28F 19/06* (2013.01)

(58) Field of Classification Search
CPC ...... C23C 22/52; C23C 22/63; C23C 8/10–18
USPC ....................................................... 148/269
See application file for complete search history.

(56) References Cited

U.S. PATENT DOCUMENTS

| | | |
|---|---|---|
| 5,510,010 A | 4/1996 | Kobor |
| 5,582,024 A | 12/1996 | Kobor |
| 2007/0079906 A1 | 4/2007 | Leuchte |

FOREIGN PATENT DOCUMENTS

| | | |
|---|---|---|
| JP | 59-118888 A | 7/1984 |
| JP | 2-93083 A | 4/1990 |
| JP | 7-268642 A | 10/1995 |
| JP | 2002-256446 A | 9/2002 |

(Continued)

OTHER PUBLICATIONS

International Search Report (PCT/ISA/210) issued in PCT/JP2017/034682, dated Oct. 31, 2017.

*Primary Examiner* — Lois L Zheng
(74) *Attorney, Agent, or Firm* — Birch, Stewart, Kolasch & Birch, LLP (57) ABSTRACT

A pipe is manufactured through injecting a chloride ion-containing aqueous solution into a copper pipe to fill the copper pipe, thereby forming a copper oxide film on an inner surface of the copper pipe.

14 Claims, 6 Drawing Sheets

(56) References Cited

FOREIGN PATENT DOCUMENTS

| | | | |
|---|---|---|---|
| JP | 2002-371374 | A | 12/2002 |
| JP | 2003-239085 | A | 8/2003 |
| JP | 2007-511668 | A | 5/2007 |
| JP | 2009-270175 | A | 11/2009 |
| JP | 5260109 | B2 | 8/2013 |
| KR | 10-2012-0060499 | A | 6/2012 |

METHOD FOR PRODUCING PIPING AND METHOD FOR FORMING OXIDE FILM ON INNER SURFACE OF COPPER PIPE

TECHNICAL FIELD

The present invention relates to a method of manufacturing a pipe, and a method of forming an oxide film on an inner surface of a copper pipe.

BACKGROUND ART

Techniques for oxidizing the surface of copper have been known. For example, Patent Document 1 discloses that a patina solution is applied to an article containing copper or a copper alloy and aged, thereby forming patina on the surface of the article in a short time. Patent Document 2 discloses that a copper article is immersed in an aqueous solution containing sodium chloride and sodium hydroxide so that a black oxidized surface film is uniformly formed on an exposed surface of the copper article, and then an acrylic resin film is electrodeposited on the oxidized surface film to give corrosion resistance to the oxidized surface film.

CITATION LIST

Patent Document

[Patent Document 1] Japanese Unexamined Patent Publication No. 2007-511668
[Patent Document 2] Japanese Unexamined Patent Publication No. H07-268642

SUMMARY OF THE INVENTION

Technical Problem

When water having a high corrosion tendency continuously flows through a copper-made water pipe used in a heat pump water heater or the like, a hole may be formed in the water pipe due to corrosion, and water may leak through it. As countermeasures against such corrosion, an inhibitor (anticorrosive agent) can be contained in water flowing through the water pipe. However, in the case of a water heater, such an inhibitor cannot be contained in water to be supplied to a user. Since water is supplied to the user in a once-through manner for use, it is difficult to use the inhibitor itself.

In view of the foregoing, it is therefore an object of the present invention to form a copper oxide film serving as an anti-corrosion protective film on an inner surface of a copper pipe constituting a pipe through a simple method.

Solution to the Problem

The present invention is directed to a method of manufacturing a pipe (10). The method includes: an oxide film formation step of forming a copper oxide film (12) on an inner surface of a copper pipe (11) through injecting a chloride ion-containing aqueous solution (L2) into the copper pipe (11) to fill the copper pipe (11). According to this method, the copper oxide film (12) serving as an anti-corrosion protective film can be formed on the inner surface of the copper pipe (11) through a simple operation of injecting the chloride ion-containing aqueous solution (L2) into the copper pipe (11) constituting the pipe (10) to fill the copper pipe (11).

From the viewpoint of easy availability and handling, the chloride ion-containing aqueous solution (L2) suitably contains an aqueous solution of sodium chloride.

In the oxide film formation step, the chloride ion-containing aqueous solution (L2) may be allowed to continuously flow through the copper pipe (11). In this case, the chloride ion-containing aqueous solution (L2) making contact with the inner surface of the copper pipe (11) is always replaced. Thus, the copper oxide film (12) having high uniformity and high stability can be formed on the inner surface of the copper pipe (11).

In the oxide film formation step, injection of the chloride ion-containing aqueous solution (L2) into the copper pipe (11), keeping of the copper pipe (11) stationary with the chloride ion-containing aqueous solution (L2) injected therein, and discharge of the chloride ion-containing aqueous solution (L2) from the copper pipe (11) may be sequentially performed. This does not allow the chloride ion-containing aqueous solution (L2) to flow through the copper pipe (11) during the formation of the copper oxide film (12). Thus, the copper oxide film (12) can be reliably formed on the inner surface of the copper pipe (11) with no interference from a shearing force applied to the inner surface of the copper pipe (11) by the flow of the chloride ion-containing aqueous solution (L2).

The present invention may further include a pretreatment step of removing a surface deposit (30) from the inner surface of the copper pipe (11) through injecting an acid aqueous solution into the copper pipe (11) to fill the copper pipe (11), the pretreatment step being performed before the oxide film formation step. The pretreatment step performed in this manner homogenizes the inner surface of the copper pipe (11) before the formation of the copper oxide film (12). Thus, the copper oxide film (12) having high uniformity and high stability can be formed on the inner surface of the copper pipe (11) in the oxide film formation step. In this case, from the viewpoint of easy availability and handling, the acid aqueous solution (L1) may contain diluted hydrochloric acid.

In the oxide film formation step, oxygen may be dissolved in the chloride ion-containing aqueous solution (L2) before the injection into the copper pipe (11). This allows the chloride ion-containing aqueous solution (L2) having a high concentration of dissolved oxygen to flow through the copper pipe (11), thereby forming the copper oxide film (12) on the inner surface of the copper pipe (11) with reliability.

The present invention is directed to a method of forming an oxide film on an inner surface of a copper pipe (11) through injecting a chloride ion-containing aqueous solution (L2) into the copper pipe (11) to fill the copper pipe (11), thereby forming a copper oxide film (12) on the inner surface of the copper pipe (11). According to such a method, the copper oxide film (12) serving as an anti-corrosion protective film can be formed on the inner surface of the copper pipe (11) through a simple operation.

DESCRIPTION OF EMBODIMENTS

Embodiments will be described in detail below.

First Embodiment

According to a method of manufacturing a water pipe (10) of a first embodiment, a copper oxide film (12) is formed on an inner surface of a copper pipe (11) constituting the water pipe (10). The method includes the manufacture of the water pipe (10) through the formation of the copper oxide film (12) on the inner surface of the copper pipe (11) itself, and the manufacture of the water pipe (10) through the formation of the copper oxide film (12) on the inner surface of the copper pipe (11) incorporated in a water heat exchanger, for example.

Examples of the copper pipe (11) constituting the water pipe (10) include those specified in JIS H3300: 2012. The copper pipe (11) may be made of copper of 99.9% purity or more, or a copper alloy with a copper content of more than 50% by mass. Typical examples of the copper alloy forming the copper pipe (11) used as the water pipe (10) include phosphorous-deoxidized copper having an alloy number: C1220, designation: C1220T, and temper: O, ½H, or H.

The method of manufacturing the water pipe (10) of the first embodiment includes a pretreatment step and an oxide film formation step.

<Pretreatment Step>

Figure 1A:
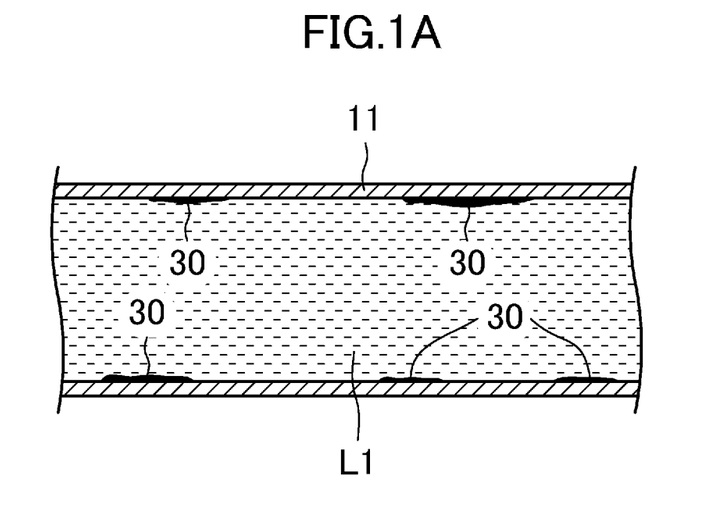
FIG. 1A is a first diagram illustrating a pretreatment step according to a first embodiment.
Figure 1B:
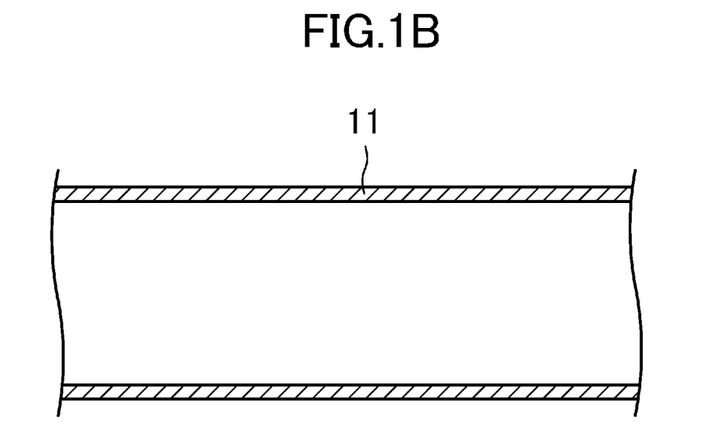
FIG. 1B is a second diagram illustrating the pretreatment step according to the first embodiment.

In the pretreatment step, as shown in FIG. 1A, an acid aqueous solution (L1) is injected into the copper pipe (11) to fill the copper pipe (11), thereby removing surface deposits (30) from the inner surface of the copper pipe (11) as shown in FIG. 1B. Through the pretreatment step of removing the surface deposits (30) from the inner surface of the copper pipe (11) using the acid aqueous solution (L1), the inner surface of the copper pipe (11) is homogenized before the formation of the copper oxide film (12). This can improve the uniformity and stability of the copper oxide film (12) formed on the inner surface of the copper pipe (11) in the subsequent oxide film formation step.

Examples of the acid aqueous solution (L1) include diluted hydrochloric acid, and diluted sulfuric acid. From the viewpoint of easy availability and handling, the acid aqueous solution (L1) suitably contains diluted hydrochloric acid, more suitably contains diluted hydrochloric acid as a main ingredient, and much more suitably consists only of diluted hydrochloric acid. The acid aqueous solution (L1) dissolves the inner surface of the copper pipe (11). From the viewpoint of effective removal of the surface deposits (30) while reducing the dissolution, the pH of the acid aqueous solution (L1) is suitably not less than 1.5 and not more than 3.0. The pH of the aqueous solution is measured based on JIS Z8802: 2011 (the same applies hereinafter).

This pretreatment step may be performed by allowing the acid aqueous solution (L1) to continuously flow from one end of the copper pipe (11) to the other. In this case, the acid aqueous solution (L1) may be circulated in the copper pipe (11), or may flow through the copper pipe (11) in a one-pass operation.

In this pretreatment step, injection of the acid aqueous solution (L1) into the copper pipe (11), retaining of the copper pipe (11) with the acid aqueous solution (L1) injected therein, and discharge of the acid aqueous solution (L1) from the copper pipe (11) may be sequentially performed. In this case, the sequence of the injection, the retaining, and the discharge may be repeated twice or more. From the viewpoint of effective removal of the surface deposits (30), the acid aqueous solution (L1) is suitably renewed every time, rather than repeatedly using the same acid aqueous solution (L1). For retaining the copper pipe (11) with the acid aqueous solution (L1) injected therein, the copper pipe (11) may be kept stationary, or may be moved, e.g., vibrated.

From the viewpoint of effective removal of the surface deposits (30) while reducing the dissolution of the inner surface of the copper pipe (11) by the acid aqueous solution (L1), time for the pretreatment, i.e., time for bringing the acid aqueous solution (L1) into contact with the inner surface of the copper pipe (11), is suitably not less than 0.5 hours and not more than 3.0 hours. From the same viewpoint, the temperature of the pretreatment, i.e., the temperature of the acid aqueous solution (L1), is suitably normal temperature (e.g., not less than 20° C. and not more than 35° C.).

Examples of the surface deposits (30) to be removed include copper oxide produced by reaction between the copper pipe (11) and oxygen in the air.

After the pretreatment, water is suitably injected into the copper pipe (11) to wash the copper pipe (11).

<Oxide Film Formation Step>

Figure 2:
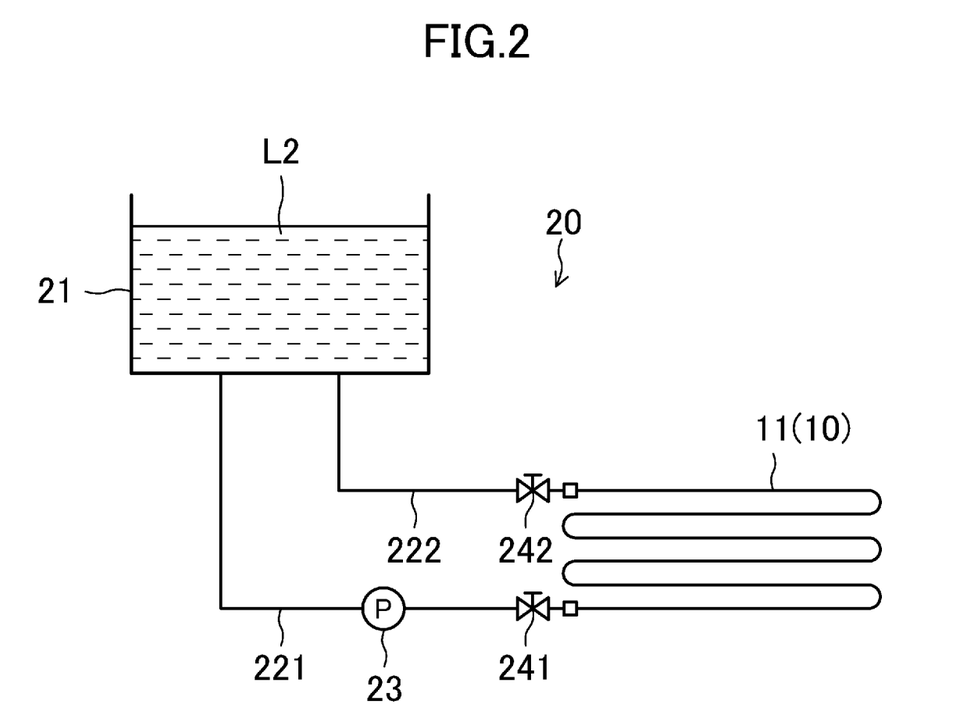
FIG. 2 is a view illustrating a configuration of an oxide film forming apparatus used in an oxide film formation step according to the first embodiment.

FIG. 2 shows an oxide film forming apparatus (20) used in an oxide film formation step according to the first embodiment.

The oxide film forming apparatus (20) has a treatment solution reservoir (21) opened upward, a treatment solution supply pipe (221) and a treatment solution recovery pipe (222) which extend from the bottom of the treatment solution reservoir (21), and a solution supply pump (23) provided for the treatment solution supply pipe (221). First and second open/close valves (241, 242) are respectively provided at an end portion of the treatment solution supply pipe (221) and an end portion of the treatment solution recovery pipe (222).

Figure 3A:
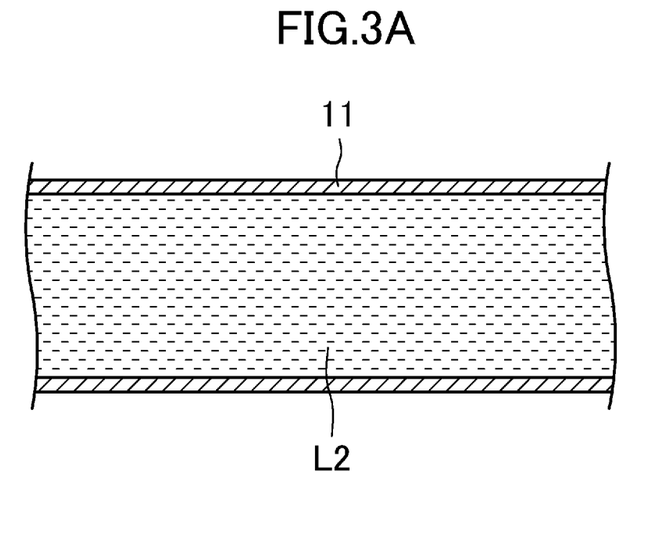
FIG. 3A is a first diagram illustrating the oxide film formation step according to the first embodiment.
Figure 3B:
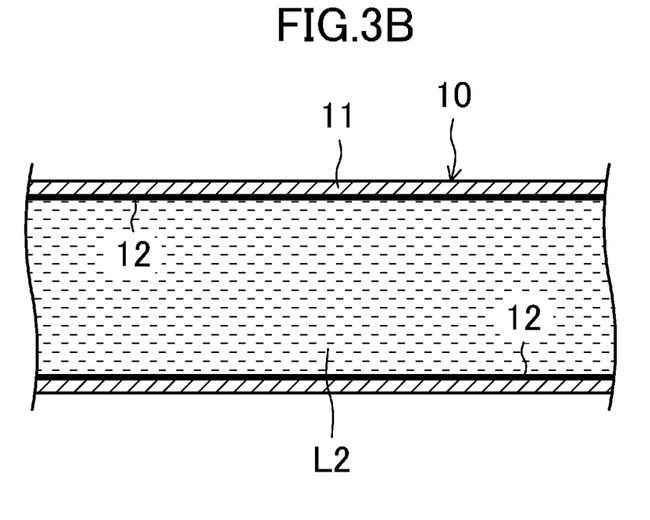
FIG. 3B is a second diagram illustrating the oxide film formation step according to the first embodiment.

In the oxide film formation step, the oxide film forming apparatus (20) is used. First, with the first and second open/close valves (241, 242) of the treatment solution supply pipe (221) and the treatment solution recovery pipe (222) closed, a chloride ion-containing aqueous solution (L2) as a treatment solution is provided into the treatment solution reservoir (21), and the ends of the copper pipe (11), from the inner surface of which the surface deposits (30) have been removed in the pretreatment step, are respectively connected to the ends of the treatment solution supply pipe (221) and the treatment solution recovery pipe (222). Then, the first and second open/close valves (241, 242) are opened and the solution supply pump (23) is operated. Thus, as shown in FIG. 3A, the chloride ion-containing aqueous solution (L2) is injected into the copper pipe (11) from the treatment solution reservoir (21) via the treatment solution supply pipe (221) to fill the copper pipe (11), and then the chloride ion-containing aqueous solution (L2) is discharged from the copper pipe (11) and recovered into the treatment solution reservoir (21) via the treatment solution recovery pipe (222). Specifically, the chloride ion-containing aqueous solution (L2) is circulated to continuously flow from the one end of the copper pipe (11) to the other. At this time, as shown in FIG. 3B, a copper oxide film (12) serving as an anti-corrosion protective film is formed on the entire inner surface of the copper pipe (11). Note that the copper oxide film (12) is a film of copper (I) ($Cu_2O$).

According to the method of manufacturing the water pipe (10) of the first embodiment, the copper oxide film (12) serving as an anti-corrosion protective film can be formed on the inner surface of the copper pipe (11) through a simple operation of injecting the chloride ion-containing aqueous solution (L2) into the copper pipe (11) constituting the water pipe (10) to fill the copper pipe (11). Thus, the copper oxide film (12) formed on the inner surface of the copper pipe (11) has high uniformity and high stability compared with a spontaneous copper oxide film. When the chloride ion-containing aqueous solution (L2) is allowed to continuously flow from the one end of the copper pipe (11) to the other, the chloride ion-containing aqueous solution (L2) making contact with the inner surface of the copper pipe (11) is always replaced. Thus, the copper oxide film (12) having high uniformity and high stability can be formed on the inner surface of the copper pipe (11). Further, since the chloride ion-containing aqueous solution (L2) is injected into the copper pipe (11) to fill the copper pipe (11), the outer surface of the copper pipe (11) can be blocked from being affected by the chloride ion-containing aqueous solution (L2). Although the mechanism of the formation of the copper oxide film (12) is unclear, it is presumed that chloride ions in the chloride ion-containing aqueous solution (L2) elute copper present on the inner surface of the copper pipe (11) as copper ions, and that the chloride ions react with oxygen dissolved in the chloride ion-containing aqueous solution (L2) on or in the vicinity of the inner surface of the copper pipe (11) to form copper oxide, which adheres and deposits on the inner surface of the copper pipe (11).

Examples of the chloride ion-containing aqueous solution (L2) include an aqueous sodium chloride solution, an aqueous potassium chloride solution, and an aqueous calcium chloride solution. The chloride ion-containing aqueous solution (L2) is suitably one of them or a mixture of two or more of them. From the viewpoint of easy availability and handling, the chloride ion-containing aqueous solution (L2) suitably contains an aqueous sodium chloride solution, more suitably contains an aqueous sodium chloride solution as a main ingredient, and much more suitably consists only of an aqueous sodium chloride solution.

The chloride ions dissolve the inner surface of the copper pipe (11). In order to reliably form the copper oxide film (12) on the inner surface of the copper pipe (11) while reducing the dissolution, the content of chloride ions in the chloride ion-containing aqueous solution (L2) is suitably not less than 50 mg/L and not more than 300 mg/L. In order to form the copper oxide film (12) on the inner surface of the copper pipe (11) with no interference from acid or alkali, the pH of the chloride ion-containing aqueous solution (L2) is suitably not less than 5.8 and not more than 8.6. Note that the pH of the chloride ion-containing aqueous solution (L2) can be adjusted through dilution with distilled water or the like.

In the method of manufacturing the water pipe (10) according to the first embodiment, the treatment solution reservoir (21) is opened upward so that the chloride ion-containing aqueous solution (L2) in the treatment solution reservoir (21) is open to the atmospheric air. At the interface between the air and the solution, oxygen in the air can be dissolved in the chloride ion-containing aqueous solution (L2) before the injection into the copper pipe (11), and the chloride ion-containing aqueous solution (L2) with a high concentration of dissolved oxygen is allowed to flow through the copper pipe (11). Thus, the copper oxide film (12) can be formed on the inner surface of the copper pipe (11) with reliability. Further, since the chloride ion-containing aqueous solution (L2) is circulated, the chloride ion-containing aqueous solution (L2) spreads over the whole inner space of the copper pipe (11), so that the copper oxide film (12) having high uniformity and high stability can be formed on the inner surface of the copper pipe (11). On the other hand, since dissolved oxygen in the chloride ion-containing aqueous solution (L2) is consumed through the oxidation of copper, there is a concern that the concentration of dissolved oxygen in the circulating chloride ion-containing aqueous solution (L2) decreases with time. However, as described above, the treatment solution reservoir (21) is opened upward so that the chloride ion-containing aqueous solution (L2) in the treatment solution reservoir (21) is open to the atmospheric air. Thus, when the chloride ion-containing aqueous solution (L2), the dissolved oxygen concentration of which has been reduced due to the consumption of dissolved oxygen, returns to the treatment solution reservoir (21), oxygen in the air can be dissolved in the chloride ion-containing aqueous solution (L2), before the injection into the copper pipe (11), in the treatment solution reservoir (21) at the interface between the air and the solution. This can increase the dissolved oxygen concentration of the chloride ion-containing aqueous solution (L2) so as to avoid the decrease in the ability of forming the copper oxide film (12). From the viewpoint of reliable formation of the copper oxide film (12) on the inner surface of the copper pipe (11), the dissolved oxygen concentration of the chloride ion-containing aqueous solution (L2) to be injected into the copper pipe (11) is suitably not less than 5 mg/L. The dissolved oxygen concentration of the chloride ion-containing aqueous solution (L2) is measured in accordance with the Winkler method, the azide modification of the Winker method, the Mirror modification, or the diaphragm electrode method specified in JIS K 0101: 1998.

From the viewpoint of avoiding the decrease in the ability of the chloride ion-containing aqueous solution (L2) to form the copper oxide film (12), it is suitable to promote the dissolution of oxygen into the chloride ion-containing aqueous solution (L2) in the treatment solution reservoir (21) through an external action. For example, the following first to third modifications are conceivable.

Figure 4A:
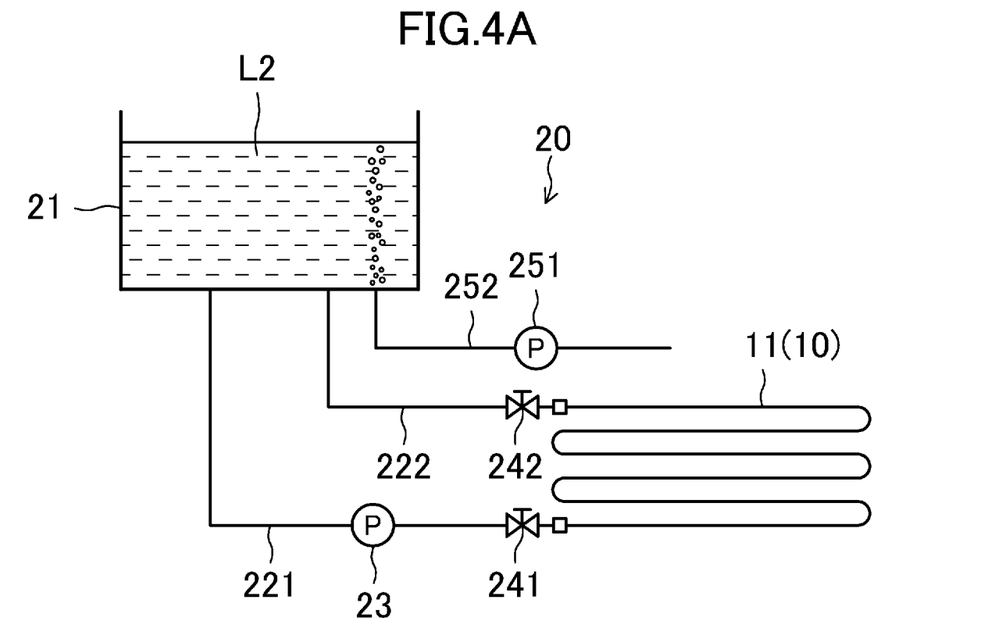
FIG. 4A is a diagram illustrating a configuration of an oxide film forming apparatus according to a first modification of the first embodiment.

FIG. 4A shows an oxide film forming apparatus (20) according to a first modification. In the oxide film forming apparatus (20) of the first modification, an air supply pipe (252) provided with an intake pump (251) is connected to the bottom of the treatment solution reservoir (21). According to the oxide film forming apparatus (20) of the first modification, when the solution supply pump (23) is operated to circulate the chloride ion-containing aqueous solution (L2) and the intake pump (251) is operated, the air is supplied from the air supply pipe (252) to the chloride ion-containing aqueous solution (L2), before the injection into the copper pipe (11), in the treatment solution reservoir (21) so that the chloride ion-containing aqueous solution (L2) bubbles. This allows the oxygen in the air to be efficiently dissolved in the chloride ion-containing aqueous solution (L2).

Figure 4B:
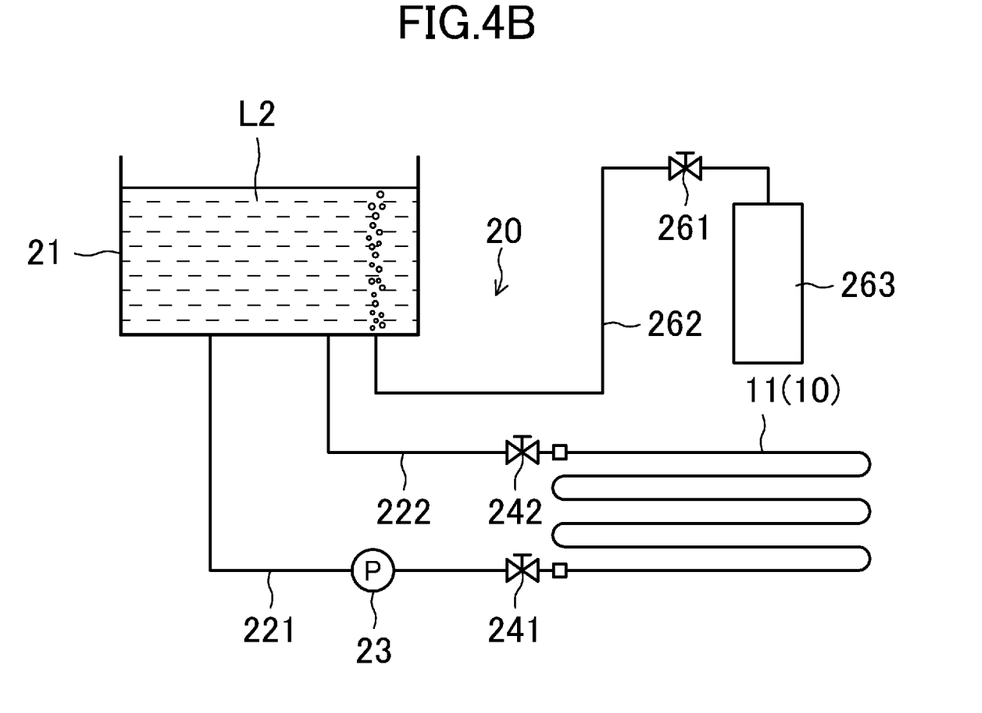
FIG. 4B is a diagram illustrating a configuration of an oxide film forming apparatus according to a second modification of the first embodiment.

FIG. 4B shows an oxide film forming apparatus (20) according to a second modification. In the oxide film forming apparatus (20) of the second modification, an oxygen supply pipe (262) provided with an open/close valve (261) extends from an oxygen cylinder (263) to be connected to the bottom of the treatment solution reservoir (21). According to the oxide film forming apparatus (20) of the second modification, when the solution supply pump (23) is operated to circulate the chloride ion-containing aqueous solution (L2) and the open/close valve (261) is opened, oxygen is supplied from the oxygen supply pipe (262) to the chloride ion-containing aqueous solution (L2), before the injection into the copper pipe (11), in the treatment solution reservoir (21) so that the chloride ion-containing aqueous solution (L2) bubbles. This allows the oxygen to be efficiently dissolved in the chloride ion-containing aqueous solution (L2).

Figure 4C:
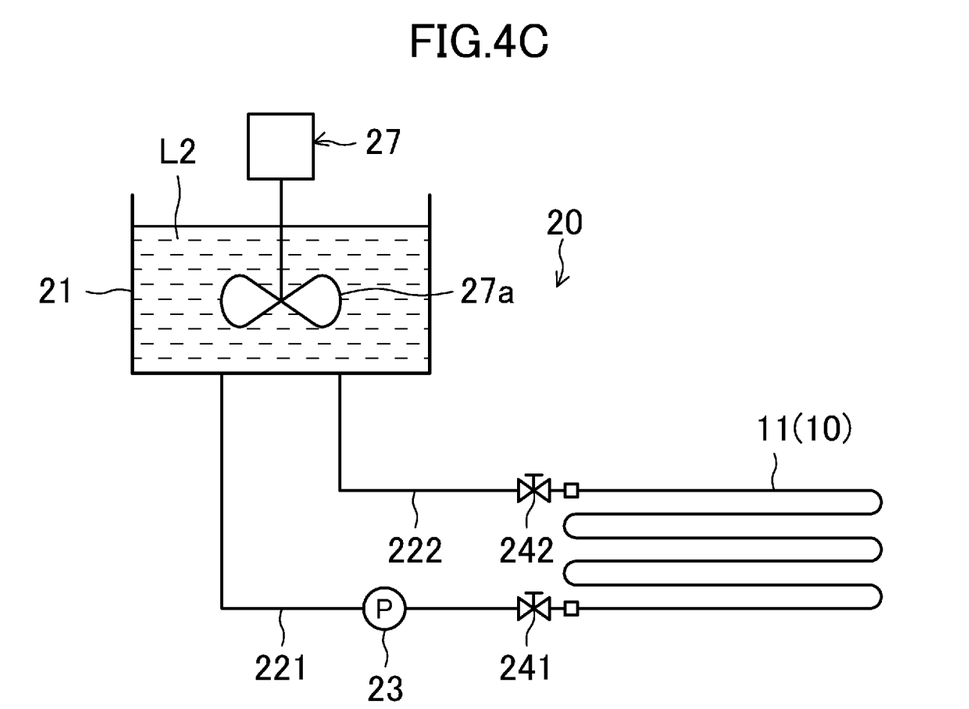
FIG. 4C is a diagram illustrating a configuration of an oxide film forming apparatus according to a third modification of the first embodiment.

FIG. 4C shows an oxide film forming apparatus (20) according to a third modification. In the oxide film forming apparatus (20) of the third modification, an agitator (27) is attached to the treatment solution reservoir (21). According to the oxide film forming apparatus (20) of the third modification, when the solution supply pump (23) is operated to circulate the chloride ion-containing aqueous solution (L2) and the agitator (27) is operated, the chloride ion-containing aqueous solution (L2), before the injection into the copper pipe (11), in the treatment solution reservoir (21) is stirred by the stirring blade (27a), thereby enlarging the interface between the air and the solution. This allows the oxygen in the air to be efficiently dissolved in the chloride ion-containing aqueous solution (L2).

In the method of manufacturing the water pipe (10) according to the first embodiment, the chloride ion-containing aqueous solution (L2) is circulated so that the chloride ion-containing aqueous solution (L2) continuously flows through the copper pipe (11). In this case, in order to reduce the interference on the formation of the copper oxide film (12) from a shearing force applied to the inner surface of the copper pipe (11) by the flow of the chloride ion-containing aqueous solution (L2), the flow rate of the chloride ion-containing aqueous solution (L2) is suitably not more than 0.5 m/s. To calculate this flow rate, the flow rate of the chloride ion-containing aqueous solution (L2) per unit time is divided by the cross-sectional area of the flow path in the copper pipe (11) (the same applies hereinafter).

From the viewpoint of reliably forming the copper oxide film (12) on the inner surface of the copper pipe (11) while reducing the dissolution of the inner surface of the copper pipe (11) by the chloride ions, time for forming the oxide film, i.e., time for bringing the chloride ion-containing aqueous solution (L2) into contact with the inner surface of the copper pipe (11), is suitably not less than 1.0 hours and not more than 5.0 hours. From the same viewpoint, the temperature at which the oxide film is formed, i.e., temperature of the chloride ion-containing aqueous solution (L2), is suitably normal temperature (e.g., not less than 20° C. and not more than 35° C.).

The dissolved oxygen concentration of the chloride ion-containing aqueous solution (L2) may be monitored over time, so that it can be determined that the formation of the copper oxide film (12) on the inner surface of the copper pipe (11) is finished when no change in the dissolved oxygen concentration is detected, or the amount of change is not more than a predetermined value. When the determination that the formation of the copper oxide film (12) is finished is made based on the monitoring of the dissolved oxygen concentration, the formation of the oxide film can be checked, and excessive processing can be omitted to optimize the processing time.

After this oxide film formation step, water is suitably injected into the manufactured water pipe (10) to wash the water pipe (10).

In the water pipe (10) manufactured in this manner, the copper oxide film (12) formed on the inner surface thereof functions as a protective film. Thus, the corrosion of the water pipe can be reduced even if water which is highly likely to corrode the water pipe (10), such as water with a high free carbonate ion concentration, a high chloride ion concentration, a high sulfate ion concentration, a high electric conductivity, or a low pH value flows continuously through the pipe.

Second Embodiment

A method of manufacturing a water pipe (10) according to a second embodiment includes a pretreatment step and an oxide film formation step, just like the method of the first embodiment. Among them, the pretreatment step is the same as that of the first embodiment, and therefore, the oxide film formation step of the second embodiment will be described below.

Figure 5:
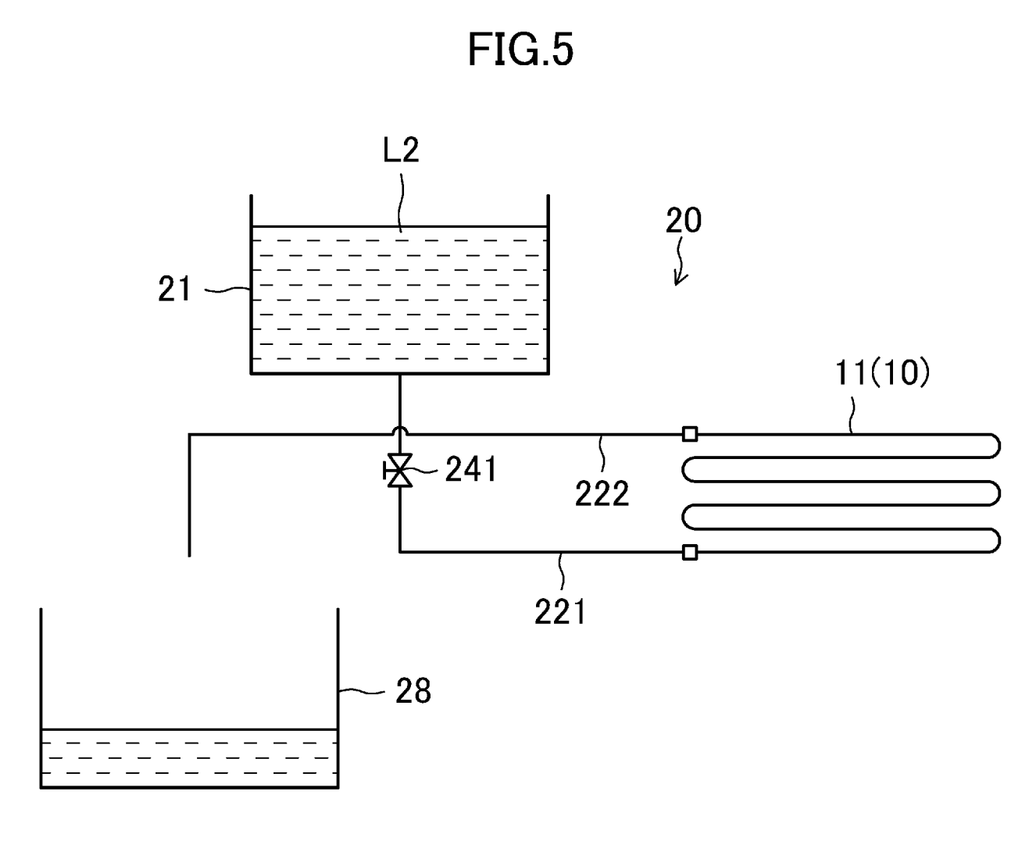
FIG. 5 is a diagram illustrating a configuration of an oxide film forming apparatus used in an oxide film formation step according to a second embodiment.

FIG. 5 shows an oxide film forming apparatus (20) used in an oxide film formation step according to the second embodiment. Note that the same components as those in the first embodiment are denoted by the same reference numerals.

This oxide film forming apparatus (20) has a treatment solution reservoir (21) which is opened upward, a treatment solution recovery reservoir (21) which is opened upward and provided below the treatment solution reservoir (21), a treatment solution supply pipe (221) extending from the bottom of the treatment solution reservoir (21), and a treatment solution recovery pipe (222) extending to the top of the treatment solution recovery reservoir (21). A first open/close valve (241) is provided for the treatment solution supply pipe (221). The oxide film forming apparatus (20) does not have the solution supply pump (23) used in the first embodiment. This can reduce the cost of the apparatus.

In the oxide film formation step of the second embodiment, the oxide film forming apparatus (20) is used. First, with the first open/close valve (241) of the treatment solution supply pipe (221) closed, a chloride ion-containing aqueous solution (L2) as a treatment solution is provided into the treatment solution reservoir (21), and the ends of the copper pipe (11), from the inner surface of which the surface deposits (30) have been removed in the pretreatment step, are respectively connected to the ends of the treatment solution supply pipe (221) and the treatment solution recovery pipe (222). At this time, the copper pipe (11) is positioned below the treatment solution reservoir (21), with one end thereof positioned below the other. Next, the first open/close valve (241) is opened so that the chloride ion-containing aqueous solution (L2) is injected into the copper pipe (11) from the treatment solution reservoir (21) via the treatment solution supply pipe (221) to fill the copper pipe (11) by making use of the head difference between the treatment solution reservoir (21) and the copper pipe (11), and then the first open/close valve (241) is closed. Subsequently, the copper pipe (11) into which the chloride ion-containing aqueous solution (L2) is injected is kept stationary for a predetermined time in this state. During this time, a copper oxide film (12) serving as an anti-corrosion protective film is formed on the entire inner surface of the copper pipe (11). Then, after a lapse of a predetermined time, the first open/close valve (241) is opened to discharge the chloride ion-containing aqueous solution (L2) from the copper pipe (11), which is recovered into the treatment solution recovery reservoir (28) via the treatment solution recovery pipe (222).

According to the method of manufacturing the water pipe (10) of the second embodiment, the copper oxide film (12) serving as an anti-corrosion protective film can be formed on the inner surface of the copper pipe (11) through a simple operation of injecting the chloride ion-containing aqueous solution (L2) into the copper pipe (11) constituting the water pipe (10) to fill the copper pipe (11). Thus, the copper oxide film (12) formed on the inner surface of the copper pipe (11) has high uniformity and high stability compared with a spontaneous copper oxide film. In addition, the injection of the chloride ion-containing aqueous solution (L2) into the copper pipe (11), the keeping of the copper pipe (11) stationary with the chloride ion-containing aqueous solution (L2) injected therein, and the discharge of the chloride ion-containing aqueous solution (L2) from the copper pipe (11) are sequentially performed without causing the chloride ion-containing aqueous solution (L2) to flow through the copper pipe (11) during the formation of the copper oxide film (12). Thus, the copper oxide film (12) can be reliably formed on the inner surface of the copper pipe (11) with no interference from a shear force applied to the inner surface of the copper pipe (11) by the flow of the chloride ion-containing aqueous solution (L2). Further, since the chloride ion-containing aqueous solution (L2) is injected into the copper pipe (11) to fill the copper pipe (11), the outer surface of the copper pipe (11) can be blocked from being affected by the chloride ion-containing aqueous solution (L2).

In order to compensate for the decrease in the dissolved oxygen concentration of the chloride ion-containing aqueous solution (L2) and to reliably form the copper oxide film (12) on the inner surface of the copper pipe (11), it is suitable to repeat the sequence of the injection of the chloride ion-containing aqueous solution (L2) into the copper pipe (11), the keeping of the copper pipe (11) stationary with the aqueous solution containing chloride ion-containing aqueous solution (L2) injected therein, and the discharge of the chloride ion-containing aqueous solution (L2) from the copper pipe (11) two or more times. In such a case, as a first method, the chloride ion-containing aqueous solution (L2) in an amount for a single treatment may be charged into the treatment solution reservoir (21) every operation. After the chloride ion-containing aqueous solution (L2) is injected into and discharged from the copper pipe (11), the chloride ion-containing aqueous solution (L2) newly charged into the treatment solution reservoir (21) may be injected into the copper pipe (11). In this method, from the viewpoint of reliably forming the copper oxide film (12) on the inner surface of the copper pipe (11), the chloride ion-containing aqueous solution (L2) is suitably renewed every time, rather than repeatedly using the same chloride ion-containing aqueous solution (L2). As a second method, a chloride ion-containing aqueous solution (L2) in an amount for several treatments may be provided into the treatment solution reservoir (21). Then, the chloride ion-containing aqueous solution (L2) injected into the copper pipe (11) is discharged, and simultaneously, a portion of the chloride ion-containing aqueous solution (L2) that is initially charged into the treatment solution reservoir (21) may be injected into the copper pipe (11). From the viewpoint of reliably forming the copper oxide film (12) with no defects on the inner surface of the copper pipe (11) while reducing the dissolution of the inner surface of the copper pipe (11) by the chloride ions, this operation is suitably repeated three times or more and five times or less.

From the viewpoint of reliably forming the copper oxide film (12) with no defects on the inner surface of the copper pipe (11) while reducing the dissolution of the inner surface of the copper pipe (11) by the chloride ions, time for forming the oxide film, i.e., time for keeping the copper pipe (11) stationary with the aqueous solution containing chloride ions (L11) injected therein, is not less than 1.0 hours and not more than 5.0 hours. Note that, when the sequence of the injection of the solution, the keeping of the pipe stationary, and the discharge of the solution is repeated, the time for keeping the pipe stationary means total stationary time.

The other features and advantages are the same as those of the first embodiment.

Third Embodiment

A method of manufacturing a water pipe (10) according to a third embodiment also includes a pretreatment step and an oxide film formation step, just like that of the first embodiment. Among them, the pretreatment step is the same as that of the first embodiment, and therefore, the oxide film formation step of the third embodiment will be described below. In the third embodiment, the same oxide film forming apparatus (20) as that used in the oxide film formation step of the second embodiment is used. Thus, the description will be made with reference to FIG. 5.

In the oxide film formation step of the third embodiment, the oxide film forming apparatus (20) shown in FIG. 5 is used. First, with the first open/close valve (241) of the treatment solution supply pipe (221) closed, a chloride ion-containing aqueous solution (L2) as a treatment solution is provided into the treatment solution reservoir (21), and the ends of the copper pipe (11), from the inner surface of which the surface deposits (30) have been removed in the pretreatment step, are respectively connected to the ends of the treatment solution supply pipe (221) and the treatment solution recovery pipe (222). At this time, the copper pipe (11) is positioned below the treatment solution reservoir (21), with one end thereof positioned below the other. Next, the first open/close valve (241) is opened so that the chloride ion-containing aqueous solution (L2) is injected into the copper pipe (11) from the treatment solution reservoir (21) via the treatment solution supply pipe (221) to fill the copper pipe (11) by making use of the head difference between the treatment solution reservoir (21) and the copper pipe (11), and that the chloride ion-containing aqueous solution (L2) is discharged from the copper pipe (11) and recovered into the treatment solution recovery reservoir (28) via the treatment solution recovery pipe (222). That is, the chloride ion-containing aqueous solution (L2) is allowed to continuously flow from the one end of the copper pipe (11) to the other in a one-pass operation. During this time, a copper oxide film (12) serving as an anti-corrosion protective film is formed on the entire inner surface of the copper pipe (11).

In the method of manufacturing the water pipe (10) according to the third embodiment, the chloride ion-containing aqueous solution (L2) is allowed to continuously flow through the copper pipe (11). In order to reduce the interference on the formation of the copper oxide film (12) from a shearing force applied to the inner surface of the copper pipe (11) by the flow of the chloride ion-containing aqueous solution (L2), the flow rate of the chloride ion-containing aqueous solution (L2) is suitably not more than 0.5 m/s.

The other features and advantages are the same as those of the first embodiment.

Fourth Embodiment

In a method of repairing a water pipe (10) according to a fourth embodiment, the method of forming an oxide film on the inner surface of the copper pipe (11) according to the method of manufacturing the water pipe (10) of the first to third embodiments is applied to a water pipe (10) whose inner surface has been corroded, or pipes whose surrounding pipes are expected to be corroded. Specifically, a chloride ion-containing aqueous solution (L2) is injected into a copper pipe (11) constituting the water pipe (10) to fill the copper pipe (11), thereby forming a copper oxide film (12) on an inner surface of the copper pipe (11).

According to the method of repairing the water pipe (10) of the fourth embodiment, the copper oxide film (12) serving as an anti-corrosion protective film can be formed on the inner surface of the copper pipe (11) through a simple operation of injecting the chloride ion-containing aqueous solution (L2) into the copper pipe (11) constituting the water pipe (10) to fill the copper pipe (11).

In the method of repairing the water pipe (10) of the fourth embodiment, it is expected that the inner surface of the water pipe (10) is somewhat corroded. Thus, from the viewpoint of forming the copper oxide film (12) having high uniformity and high stability on the inner surface of the copper pipe (11), it is suitable to inject an acid aqueous solution (L1) into the copper pipe (11) to fill the copper pipe (11) so as to perform a pretreatment for removing surface deposits (30) from the inner surface of the copper pipe (11). Since the repair of the water pipe (10) is expected to be carried out at the installation site of a water heater or the like, it is suitable to use the simple and portable oxide film forming apparatus (20) of any one of the first to third embodiments shown in FIGS. 2 and 5.

The other features and advantages are the same as those of the first to third embodiments.

Other Embodiments

In the first to fourth embodiments, the method of manufacturing the water pipe (10) and the method of repairing the water pipe (10) have been described, but the disclosure of the first to fourth embodiments is not limited thereto. The methods can be applied to the manufacture and repair of any kinds of pipes as long as the pipe is a copper pipe (11).

In the first to third embodiments, the pretreatment is performed before forming the copper oxide film (12), but the disclosure of the first to fourth embodiments is not limited thereto. When no surface deposit (30) is found on the inner surface of the pipe, e.g., when a new copper pipe (11) is used, the pretreatment may be skipped.

While embodiments have been described above, various modifications in form and detail may be made without departing from the spirit and scope of the present invention as set forth in the appended claims.

INDUSTRIAL APPLICABILITY

The present invention is useful for a method of manufacturing a pipe and a method of forming an oxide film on an inner surface of a copper pipe.

DESCRIPTION OF REFERENCE CHARACTERS

L1 Acid Aqueous Solution
L2 Chloride Ion-Containing Aqueous Solution
10 Water Pipe
11 Copper Pipe
12 Copper Oxide Film
20 Oxide Film Forming Apparatus
21 Treatment Solution Reservoir
221 Treatment Solution Supply Pipe
222 Treatment Solution Recovery Pipe
23 Solution Supply Pump
241 First Open/Close Valve
242 Second Open/Close Valve
251 Intake Pump
252 Air Supply Pipe
261 Open/Close Valve
262 Oxygen Supply Pipe
263 Oxygen Cylinder
27 Agitator
27a Stirring Blade
28 Treatment Solution Recovery Reservoir
30 Surface Deposit

The invention claimed is:

1. A method of manufacturing a pipe, the method comprising:
   an oxide film formation step of forming a copper oxide film on an inner surface of a copper pipe through injecting a chloride ion-containing aqueous solution into the copper pipe to fill the copper pipe,
   wherein the chloride ion-containing aqueous solution is injected into the copper pipe according to a process that reduces interference on the formation of the copper oxide film from a shearing force applied to the inner surface of the copper pipe due to a flow of the chloride ion-containing aqueous solution through the copper pipe, wherein
   a content of chloride ions in the chloride ion-containing aqueous solution is not less than 50 mg/L and not more than 300 mg/L.

2. The method of claim 1, wherein
   in the oxide film formation step, the chloride ion-containing aqueous solution is allowed to continuously flow through the copper pipe.

3. The method of claim 1, wherein
   in the oxide film formation step, injection of the chloride ion-containing aqueous solution into the copper pipe, keeping of the copper pipe stationary with the chloride ion-containing aqueous solution injected therein, and discharge of the chloride ion-containing aqueous solution from the copper pipe are sequentially performed.

4. The method of claim 1, further comprising:
   a pretreatment step of removing a surface deposit from the inner surface of the copper pipe through injecting an acid aqueous solution into the copper pipe to fill the copper pipe, the pretreatment step being performed before the oxide film formation step.

5. The method of claim 4, wherein
   the acid aqueous solution contains diluted hydrochloric acid.

6. The method of claim 1, wherein
   in the oxide film formation step, oxygen is dissolved in the chloride ion-containing aqueous solution before the injection into the copper pipe.

7. The method of claim 6, wherein
   a dissolved oxygen concentration of the chloride ion-containing aqueous solution is not less than 5 mg/L.

8. The method of claim 6, wherein
   oxygen is dissolved in the chloride ion-containing aqueous solution by bubbling of the chloride ion-containing aqueous solution with air or oxygen.

9. The method of claim 6, wherein
oxygen is dissolved in the chloride ion-containing aqueous solution by stirring the chloride ion-containing aqueous solution.

10. The method of claim 1, wherein
the chloride ion-containing aqueous solution contains an aqueous sodium chloride solution.

11. The method of claim 1, wherein
a pH of the chloride ion-containing aqueous solution is not less than 5.8 and not more than 8.6.

12. A method of forming an oxide film on an inner surface of a copper pipe through injecting a chloride ion-containing aqueous solution into the copper pipe to fill the copper pipe, thereby forming a copper oxide film on the inner surface of the copper pipe,
wherein the chloride ion-containing aqueous solution is injected into the copper pipe according to a process that reduces interference on the formation of the copper oxide film from a shearing force applied to the inner surface of the copper pipe due to a flow of the chloride ion-containing aqueous solution through the copper pipe, wherein
a content of chloride ions in the chloride ion-containing aqueous solution is not less than 50 mg/L and not more than 300 mg/L.

13. A method of manufacturing a pipe, the method comprising:
an oxide film formation step of forming a copper oxide film on an inner surface of a copper pipe through injecting a chloride ion-containing aqueous solution in which a content of chloride ions is not less than 50 mg/L and not more than 300 mg/L into the copper pipe to fill the copper pipe.

14. A method of forming an oxide film on an inner surface of a copper pipe through injecting a chloride ion-containing aqueous solution in which a content of chloride ions is not less than 50 mg/L and not more than 300 mg/L into the copper pipe to fill the copper pipe, thereby forming a copper oxide film on the inner surface of the copper pipe.

* * * * *